(12) United States Patent
Emgin et al.

(10) Patent No.: US 10,579,096 B1
(45) Date of Patent: Mar. 3, 2020

(54) CONTACT DESIGN FOR EXTERNAL ACCESSORIES

(71) Applicant: Apple Inc., Cupertino, CA (US)

(72) Inventors: Senem E. Emgin, Mountain View, CA (US); Florence W. Ow, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/416,783

(22) Filed: May 20, 2019

Related U.S. Application Data

(60) Provisional application No. 62/734,113, filed on Sep. 20, 2018.

(51) Int. Cl.
| H01R 13/62 | (2006.01) |
| G06F 1/16 | (2006.01) |
| H01R 31/06 | (2006.01) |

(52) U.S. Cl.
CPC .......... *G06F 1/1601* (2013.01); *G06F 1/1626* (2013.01); *G06F 1/1632* (2013.01); *H01R 13/6205* (2013.01); *H01R 31/06* (2013.01)

(58) Field of Classification Search
CPC ................................................ H01R 13/6205
USPC .............................. 710/303; 439/39; 361/683
See application file for complete search history.

(56) References Cited

U.S. PATENT DOCUMENTS

| 3,521,216 | A | * | 7/1970 | Tolegian | ............ | H01R 13/6205 |
| | | | | | | 439/39 |
| 3,808,577 | A | * | 4/1974 | Mathauser | ......... | H01R 13/6205 |
| | | | | | | 439/39 |
| 4,211,456 | A | * | 7/1980 | Sears | ................. | H01R 13/6205 |
| | | | | | | 439/39 |
| 5,812,356 | A | * | 9/1998 | O'Connor | ............. | G06F 1/1632 |
| | | | | | | 335/179 |
| 5,829,987 | A | * | 11/1998 | Fritsch | ............... | H01R 13/7037 |
| | | | | | | 439/38 |
| 8,602,795 | B2 | * | 12/2013 | Hsu | ..................... | H01R 13/6205 |
| | | | | | | 439/39 |
| 9,062,695 | B2 | * | 6/2015 | Witter | ................ | H01R 13/6205 |
| 9,660,378 | B2 | * | 5/2017 | Silvers | ............... | H01R 13/6205 |
| 9,778,705 | B2 | | 10/2017 | Esmaeili et al. | | |
| 9,977,460 | B2 | | 5/2018 | Wagman et al. | | |
| 10,082,840 | B2 | | 9/2018 | Esmaeili et al. | | |
| 2006/0134978 | A1 | * | 6/2006 | Rosen | .................. | A63H 33/042 |
| | | | | | | 439/581 |

(Continued)

*Primary Examiner* — Adrian S Wilson

(74) *Attorney, Agent, or Firm* — Kilpatrick Townsend & Stockton LLP

(57) ABSTRACT

The described embodiments relate generally to contact designs for electrically coupling electronic devices and electronic accessories. Some embodiments of the present invention relate to an electronic device including a housing, one or more magnets configured to align and removably couple the electronic accessory to the electronic device, and a contact area disposed at an external surface of the housing, the contact area including two or more spaced apart contacts. Each of the contacts includes a conductive contact surface positioned at the external surface of the housing, the contact surface configured to directly contact a corresponding contact of the electronic accessory when the electronic device is coupled to the electronic accessory, and an electrically-conductive via extending from the contact surface through the outer surface of housing.

20 Claims, 10 Drawing Sheets

(56) References Cited

U.S. PATENT DOCUMENTS

| | | | |
|---|---|---|---|
| 2006/0145663 A1* | 7/2006 | Shiff | H01R 13/6205 |
| | | | 320/125 |
| 2008/0110672 A1* | 5/2008 | Ryan | H05K 5/0204 |
| | | | 174/542 |
| 2008/0305649 A1* | 12/2008 | Didur | H01R 13/6205 |
| | | | 439/39 |
| 2009/0239392 A1* | 9/2009 | Sumitomo | H01R 13/6205 |
| | | | 439/39 |
| 2012/0178270 A1* | 7/2012 | McElroy | H01R 13/22 |
| | | | 439/39 |
| 2013/0078855 A1* | 3/2013 | Hornick | H01R 13/73 |
| | | | 439/571 |
| 2013/0170126 A1* | 7/2013 | Lee | G06F 1/1675 |
| | | | 361/679.17 |
| 2017/0068276 A1 | 3/2017 | Wagman et al. | |
| 2018/0364769 A1 | 12/2018 | Esmaeili et al. | |

* cited by examiner

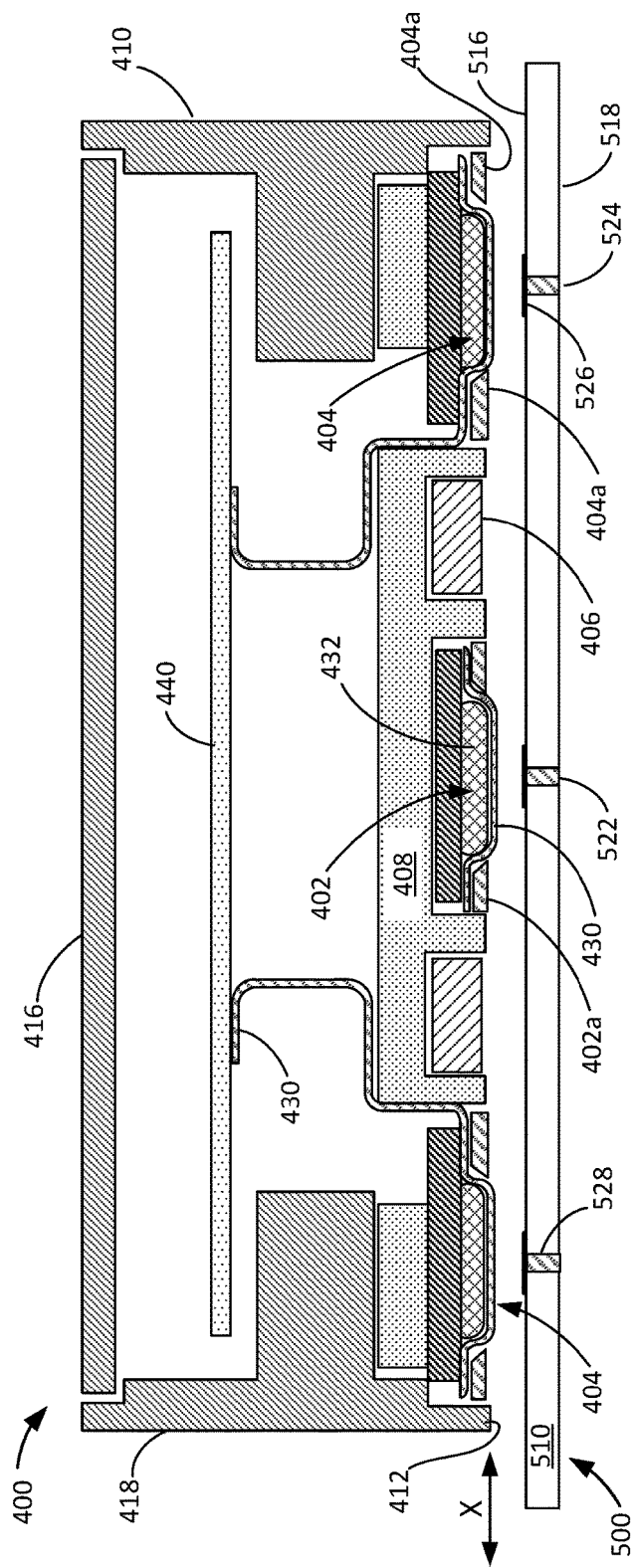
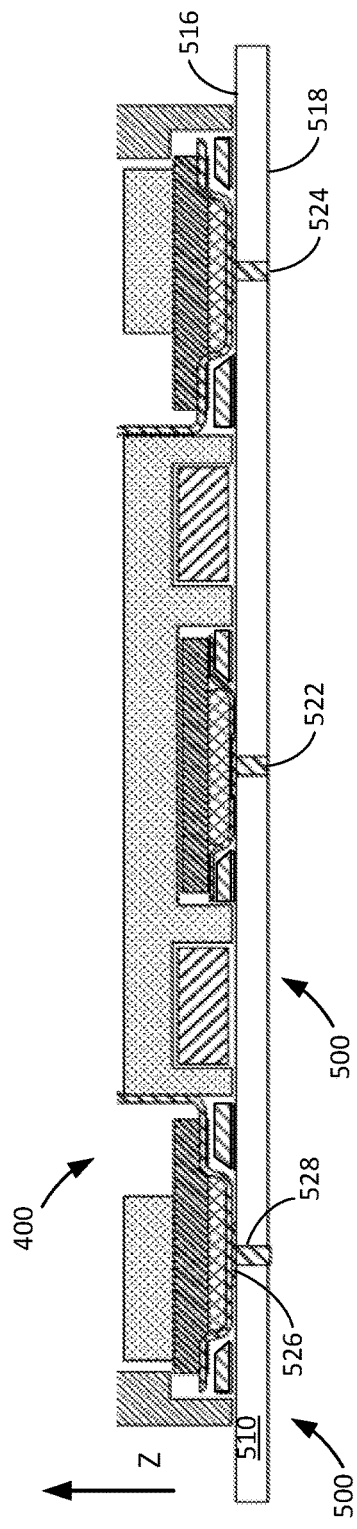

CONTACT DESIGN FOR EXTERNAL ACCESSORIES

CROSS-REFERENCES TO RELATED APPLICATIONS

This application claims the benefit of U.S. Provisional Application No. 62/734,113, filed Sep. 20, 2018, entitled "CONTACT DESIGN FOR EXTERNAL ACCESSORIES." The disclosure of this application is incorporated by reference herein in its entirety.

FIELD

Embodiments of the disclosure relate generally to contact designs for electrically coupling a first electronic device with a second electronic device.

BACKGROUND

The number of types of electronic devices that are commercially available has increased tremendously the past few years and the rate of introduction of new devices shows no signs of abating. Electronic devices, such as tablet computers, laptop computers, netbook computers, desktop computers, all-in-one computers, cell phones, smart phones, media phones, portable media players, navigation systems, displays and others, have become ubiquitous. External electronic accessories or peripherals for such devices including cameras, keyboards, storage devices, mice, lights, and batteries to name a few, have become prevalent as well.

Power and/or data may be provided from one electronic device or electronic accessory to another over cables that can include one or more wire conductors. A connector insert that includes one or more electrical contacts can be located at each end of such cables and can be inserted into a corresponding connector receptacle in the communicating electronic devices. In other systems, electrical contacts on the devices or accessories can come into direct contact with each other without the need for intervening cables and/or a connector insert and receptacle.

In systems where electrical contacts on two electronic devices come into direct contact with each other without a connector plug/receptacle arrangement, it can be difficult to generate and maintain enough normal force to ensure a good electrical connection between contacts in the two devices. To provide a sufficient normal force, electrical contacts can sometimes have a certain depth and/or consume a relatively large volume of space in the electronic device. The loss of this space may mean that the electronic device is either larger or includes a reduced set of functionality than may otherwise be desirable. Additionally, such contacts may conspicuous or might otherwise detract from the aesthetic appearance of the device.

Connector systems in general may inadvertently provide paths for the ingress of moisture, liquids, or other fluids. These connector systems may also provide pathways whereby external dust or particulate matter may reach an interior of an electronic device.

SUMMARY

Embodiments of the disclosure pertain to connector systems that enable two different electronic devices to be electrically connected to each other such that electrical contacts in each device are appropriately aligned and provided with sufficient normal force to provide a strong electrical connection while consuming a minimal amount of volume within the devices. Connector systems according to embodiments of the disclosure can be inconspicuous and aesthetically pleasing while preventing or greatly limiting the ingress of fluid or debris into an electronic device.

According to some embodiments a connector system of the disclosure includes a first set of contacts on a first device and a second set of contacts on a second device that can be aligned with and coupled to the first set of contacts. The contacts on the first device can be formed at or over an external surface of the first device without requiring a cavity or other type of opening typically associated with a receptacle connector. The contacts on the second device can also be positioned at an exterior surface of the second device and can include a contact surface that is compliant and slightly proud (i.e., extends slightly beyond) a housing surface of the second device. One or both of the first device and second device can include one or more magnetic elements, such as magnets or magnetic components, that facilitate alignment of the two devices during a mating event and impart a sufficient normal force such that the compliant and slightly proud contacts of the second device are pushed into the contacts of the first device creating a strong and secure electrical connection between them.

In some embodiments the first device can include multiple sets of similarly arranged contacts distributed across one or more external surfaces of the device such that a second device can be electrically connected to the first device at multiple different locations. For example, at any one of the different multiple contact sets. Additionally, each set of the multiple contacts can be arranged in a symmetrical fashion that enables the second device to be electrically connected to each set in more than one orientation as described herein.

In some embodiments the second device can include at least two contacts, a positive contact and a negative contact, for receiving power from the first device. In some embodiments the contacts can be arranged in a bullseye design that enables the second device to be electrically connected to and receive power from the first device regardless of its rotational orientation in the connected position. In other embodiments the contacts of the second device can be arranged in a symmetrical manner that allows the second device to be attached and electrically coupled to the first device in two, four or more different orientations as described herein.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 5 is a simplified cross-sectional view of the electronic device shown in FIGS. 4A-4C adjacent to a portion of an electronic device having external contacts as described with respect to FIG. 3;

FIG. 6 is a simplified cross-sectional view of the electronic devices shown in FIG. 5 in a mated position;

DETAILED DESCRIPTION

Some embodiments of the disclosure pertain to a connector system that consumes a minimal amount of space (e.g., volume) within an electronic device while being inconspicuous and preventing or greatly limiting the ingress of fluid or debris into the device. The connector system can include a first set of contacts on a first device and a second set of contacts on a second device that can be aligned with and coupled to the first set of contacts. The contacts on the first device can be formed at or over an external surface of the first device without requiring a cavity or other type of opening typically associated with a receptacle connector. The contacts on the second device can also be positioned at an exterior surface of the second device and can include a contact surface that is compliant and slightly proud (i.e., extends slightly beyond) a housing surface of the second device. One or both of the first device and second device can include one or more magnetic elements, such as magnets or magnetic components, that facilitate alignment of the two devices during a mating event and impart a sufficient normal force to that the compliant and slightly proud contacts of the second device are pushed into the contacts of the first device creating a strong and secure electrical connection between them.

Certain embodiments of the disclosure pertain to electronic devices that can include electrical contacts as described herein and arranged in patterns as described herein. In some embodiments an electronic device can include multiple sets of similarly arranged contacts distributed across one or more external surfaces of the device such that a second device can be electrically connected to the electronic device at multiple different locations. For example, at any one of the different multiple contact sets. Additionally, each set of the multiple contacts can be arranged in a symmetrical fashion that enables the second device to be electrically connected to each set in more than one orientation as described herein.

In some embodiments an electronic device can include at least two contacts, a positive contact and a negative contact, for receiving power from a first device. In some embodiments the contacts can be arranged in a bullseye design that enables the electronic device to be electrically connected to and receive power from the first device regardless of its rotational orientation in the connected position. In other embodiments the contacts of the electronic device can be arranged in a symmetrical manner that allows the electronic device to be attached and electrically coupled to the first device in two, four or more different orientations as described herein.

Figure 1:
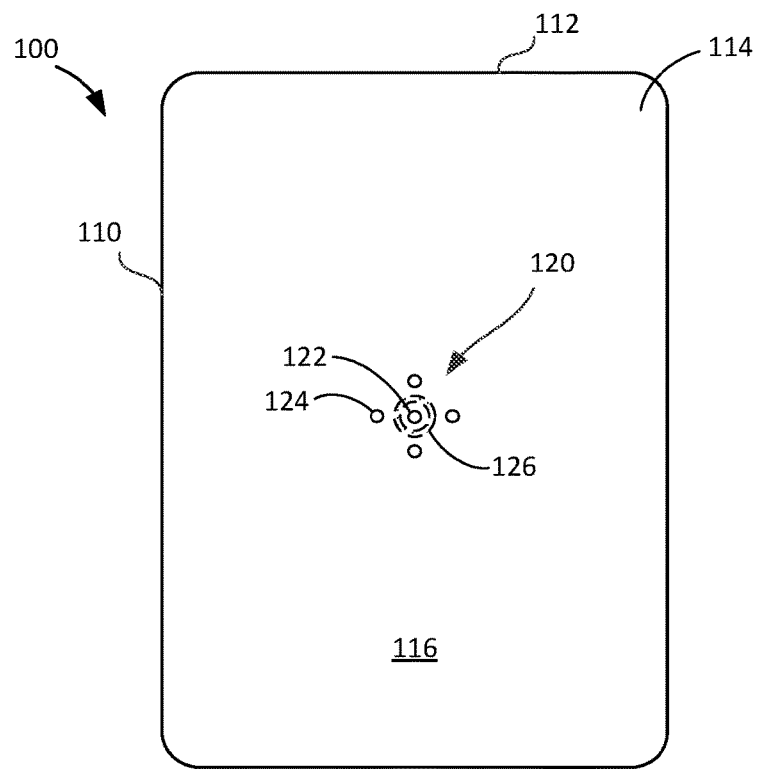
FIG. 1 is a simplified plan view of a back surface of an electronic device according to some embodiments of the disclosure.
Figure 2A:
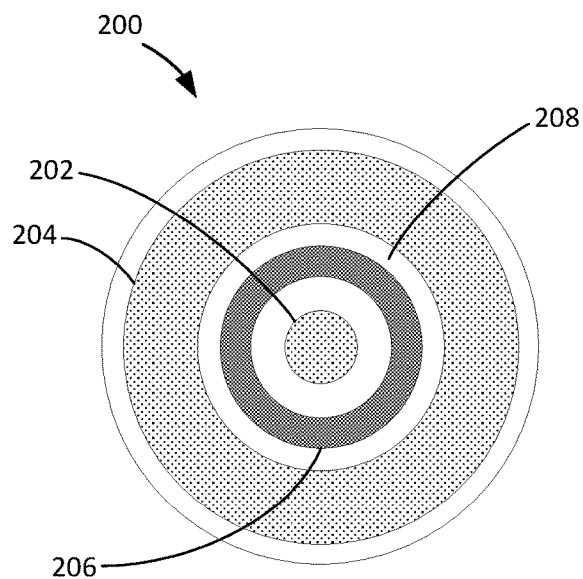
FIG. 2A is a simplified illustration of a contact pattern that can be included on a second electronic device according to some embodiments of the disclosure that can be mated with the electronic device shown in FIG. 1.

In order to better appreciate and understand embodiments of the disclosure, reference is made to FIGS. 1 and 2A below. FIG. 1 is a simplified plan view of a back surface of a first electronic device 100 and FIG. 2A is a simplified illustration of a contact pattern 200 that can be included on a second electronic device and mated with (i.e., electrically and mechanically connected to) first device 100. In some embodiments electronic device can be considered a host device while contact pattern 200 can be part of an accessory device. Examples of host devices include, but are not limited to tablet computers, laptop computers, netbook computers, desktop computers, all-in-one computers and smart phones. Examples of accessory devices include, but are not limited to cameras or camera lenses, input devices, storage devices, and power supplies (e.g., a rechargeable battery pack).

Electronic device 100 includes a housing 110 (e.g., a frame, shell, enclosure) including one or more sides or walls. For example, housing 110 can include a back wall 114 opposite a cover glass (not shown) at a front surface of the device and four sidewalls 112 that extend between back wall 114 and the cover glass such that housing 110 forms an enclosure within which various electronic components of device 100 can be contained. Housing 110 can be monolithically formed or constructed with separate components.

As shown in FIG. 1, electronic device 100 can include a contact arrangement 120 that includes multiple external electrical contacts that enable electronic device 100 to share power, data or both with a second electronic device, such as an electronic accessory (not shown in FIG. 1), via corresponding contacts of the accessory. According to embodiments of the disclosure, contacts 120 can be formed at an external surface 116 of electronic device 100. In FIG. 1, external surface 116 is a back surface of device 100 that is part of back wall 114 but embodiments of the disclosure are not limited to having contacts 120 on the back surface and in other embodiments, contacts 120 can disposed on a front or side surface of device 100. Additionally, electronic device 100 presented in FIG. 1 includes five contacts 120, embodiments of the disclosure are not limited to any particular number of contacts and some embodiments include fewer or more than five contacts. For embodiments that provide power from electronic device 100 to an accessory device, contacts 120 include at least two contacts. A first positive polarity contact and a second, negative polarity contact. In some embodiments data can be transferred through the same two contacts by alternating data and power over the contacts.

In some embodiments contacts 120 can be arranged in a symmetrical design that enables an accessory device to be electrically connected to electronic device 100 through contacts 120 in more than one orientation. For example, in FIG. 1 contacts 120 include a single, central contact 122 and four outer contacts 124 spaced apart from contact 122 at equal distances and positioned radially around the central contact at 0, 90, 180 and 270 degrees. In some embodiments, central contact 122 and outer contacts 124 can have opposite polarities. For example, central contact 122 can have a positive polarity and each of contacts 124 can have a negative polarity.

As contacts 122, 124 are external contacts, some embodiments of the disclosure can include one or more passive sensors (e.g., Hall effect sensors) that detect when an accessory or other device is properly mated with electronic device 100 enabling electronic device. Such embodiments can keep contacts 122, 124 in an open state and initiate power and/or data transfer between the contacts and another device only after the passive sensors indicate the devices are properly attached thus preventing any potential short circuiting that can otherwise be caused by a conductive component in a device spanning and electrically connecting contact 122 to one of contacts 124.

Reference is now made to FIG. 2A, which is a simplified illustration of a contact pattern 200 that can be included on a second electronic device that can be mated with (i.e., electrically and mechanically connected to) first device 100. Contact pattern 200 is a bullseye design that includes a central contact 202 and an annular contact 204 that is a continuous ring contact extending circumferentially around center contact 202. Annular contact 204 is concentric with contact 202 and separated from contact 202 by an electrical insulator 208 (e.g., plastic or a similarly suitable material). Similar to contacts 122, 124, central contact 202 and annular contact 204 can have opposite polarities. For example, on some embodiments, central contact 202 can have a positive polarity while annular ring contact 204 can have a negative polarity. In some embodiments the polarity of contacts 202, 204 can be switched (i.e, set to either positive or negative polarity by circuitry within the electronic device that contact pattern 200 is part of) based on the polarity of contacts of the electronic device (e.g., device 100) contacts 202, 204 are coupled to. In other embodiments, the polarity of contacts 202, 204 can be pre-determined or pre-set.

Figure 2B:
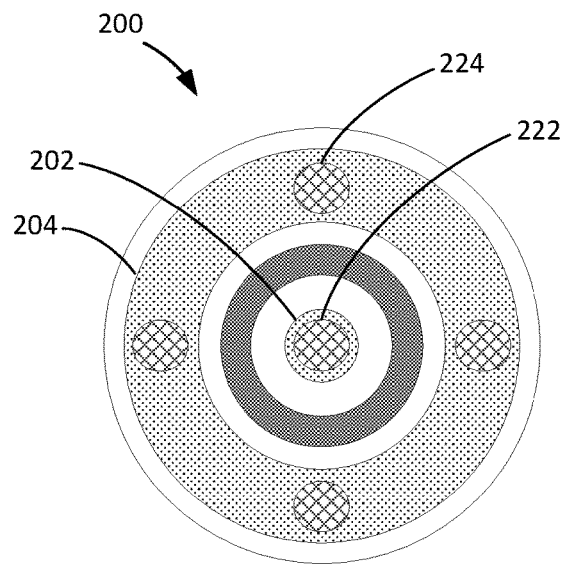
FIG. 2B is a simplified illustration of the contact pattern shown in FIG. 2A aligned with contacts of the electronic device shown in FIG. 1.

When an accessory device having contact pattern 200 is mated with electronic device 100, central contact 202 is positioned, sized and shaped to electrically couple to central contact 122 and annular contact 204 is positioned, sized and shaped to electrically couple to each of the outer contacts 124 as shown in FIG. 2B. The arrangement of contacts 122, 124 and contacts 202, 204 enables the accessory to be operatively coupled to electronic device 100 irrespective of the rotational orientation of the accessory device.

To facilitate alignment and proper mating of contact pattern 200 to contacts 120, electronic device 100 can include one or more magnetic elements 126 and contact pattern 200 can include one or more magnetic elements 206. At least one of magnetic elements 126 and 206 includes a magnet that can be attracted to a second magnet or a magnetic component (e.g., a metal plate) in the other set of magnetic elements to secure the accessory device and electronic device together in a mated position as discussed in more detail below such that contact 122 is electrically coupled to contact 202 and each of contacts 124 is electrically coupled to annular contact 204. In some embodiments the magnetic elements 126 and 206 are arranged to form a clocking pattern (e.g., by positioning the magnetic elements in a certain pattern) that assists or forces an electronic device having contact pattern 200 to be coupled to electronic device 100 in a specific rotational orientation. For example, in some embodiments an accessory device having contact pattern 200 can be a camera accessory for which it is desirable that the lens or mirror of the camera be oriented in a specific relationship relative the electronic device 100. In other embodiments, magnetic elements 126 and 206 do not provide a clocking feature and instead are primarily used for aligning and self-centering the two devices.

Figure 3:
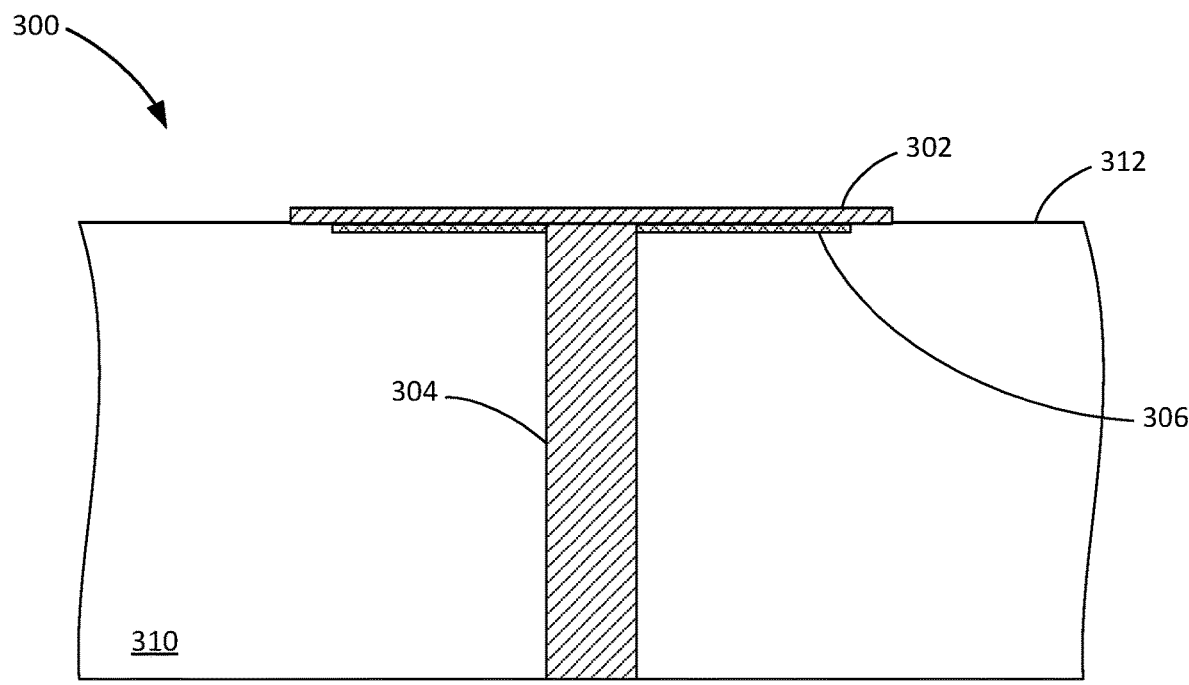
FIG. 3 is a simplified cross-sectional view of an external contact according to some embodiments of the disclosure that can be representative of external contacts 120 of the electronic device shown in FIG. 1.

As stated above, each of the contacts 120 consumes a minimal amount of space (e.g., volume) within electronic device 100 and can be located at an external surface of device 100, such as back surface 116. Thus, device 100 does not include an opening or cavity in which contacts 120 are disposed which could otherwise be a point of ingress of fluid or debris into the electronic device. FIG. 3 is a simplified cross-sectional view of an external contact 300 according to some embodiments of the disclosure. Contact 300 can be representative of each of external contacts 120 shown in FIG. 1.

As shown in FIG. 3, contact 300 includes an electrically conductive contact surface 302 that is formed over an exterior surface 312 of an electronic device. Exterior surface 312 can be representative of surface 116 shown in FIG. 1. In some embodiments, electrically conductive contact surface 302 can be formed with a physical vapor deposition (PVD) or similar processes (e.g., electroless plating) that enables the contact surface 302 to be sufficiently thin (e.g., 1000 nm or less in some embodiments and 2000 or less in some embodiments) such that it is essentially flush with adjacent portions of exterior surface 312 and the entirety of the exterior surface 312 is perceived as a continuous or substantially continuous smooth surface where any step or elevation difference between the contact surface 302 and the surrounding portions of exterior surface 312 cannot be detected when a user's finger is run across the exterior surface 312 and over the contact surface 302. Additionally, in some embodiments contact surface 302 can be chosen to have a color that is similar to that of exterior surface 312 so that the contact 300 blends in with the outer surface of the external device the contact is part of.

Contact 300 further includes a via 304 extending through a wall 310, which can be representative of a wall of housing 110, such as back wall 114. Via 304 can be laser cut or drilled through wall 310 or otherwise suitably formed therein. The via can be filled with a metal or other conductive material to electrically connect contact surface 302 to circuitry (e.g., one or more discrete electrical components, such as resistors, capacitors, transistors; one or more integrated circuits; electrical ground and/or other electrical components, such as a battery, sensor, etc.) within the housing of the electronic device that wall 310 is part of enabling power and/or data to be transferred between the electronic device that includes contact 300 and another electronic device, such as an accessory device. For example, in some embodiments, a flex board or similar circuit board (not shown) can be disposed within the housing, and via 304 can be electrically connected to a bonding pad and/or trace formed on the circuit board. In other embodiments, electric traces can be formed directly on the inner surface of wall 310 (i.e., within the housing of the device that includes contact 300) and the via can connect directly to one or more of such traces.

In some embodiments contact surface 302 can be formed directly on external surface 312 of wall 310. In other embodiments, an adhesion layer 306 can first be formed at surface 312 and then contact surface 302 can be formed over the adhesion layer 306. As an example, in some embodiments wall 310 can be part of a cosmetic glass component that forms a back surface of an electronic device, such as a tablet computer or smart phone. Certain metals that are appropriate for contacts surface 302 may not adhere well to glass surface 312. For example, in some embodiments contact surface 302 can be a thin layer (e.g., 1000 nm) of aluminum titanium nitride (AlTiN). To improve adhesion of the AlTiN to surface 312, a thin electrically conductive layer (e.g., 100 nm) of titanium (Ti) can be form in the contact area first using a PVD or similar process. The titanium adhesion layer 306 exhibits strong adhesion to glass and the AlTiN contact surface 302 exhibits strong adhesion to the titanium layer.

Generally, wall 310 is part of a housing of an electronic device that is constructed out of one or more electrically insulating materials (e.g., glass, plastic, or suitable composite). In some embodiments, however, wall 310 can be constructed of one or more electrically conductive materials (e.g., conductive carbon fiber or aluminum or other suitable material). In such embodiments, the via 18 can include one or more thin dielectric insulation layers that are deposited within and conform to the sidewalls of the hole after the hole is laser etched, drilled or otherwise formed through wall 310. A conductive metal layer can then be deposited within the hole filling the via such that the one or more dielectric layers separate and electrically isolate the metal via from wall 310.

Figure 4A:
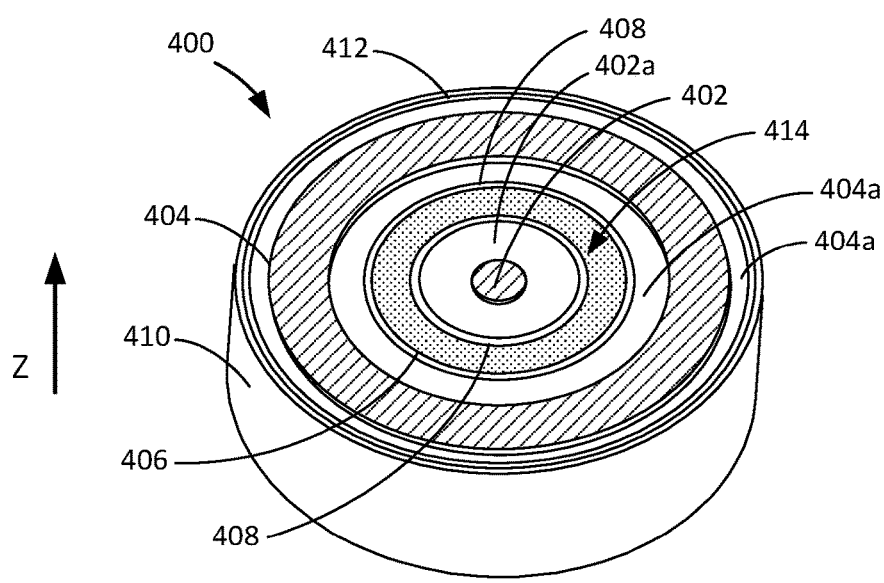
FIG. 4A is a simplified bottom perspective view of an electronic device according to some embodiments of the disclosure having contacts that can be mated with contacts 120 of the electronic device shown in FIG. 1.
Figure 4B:
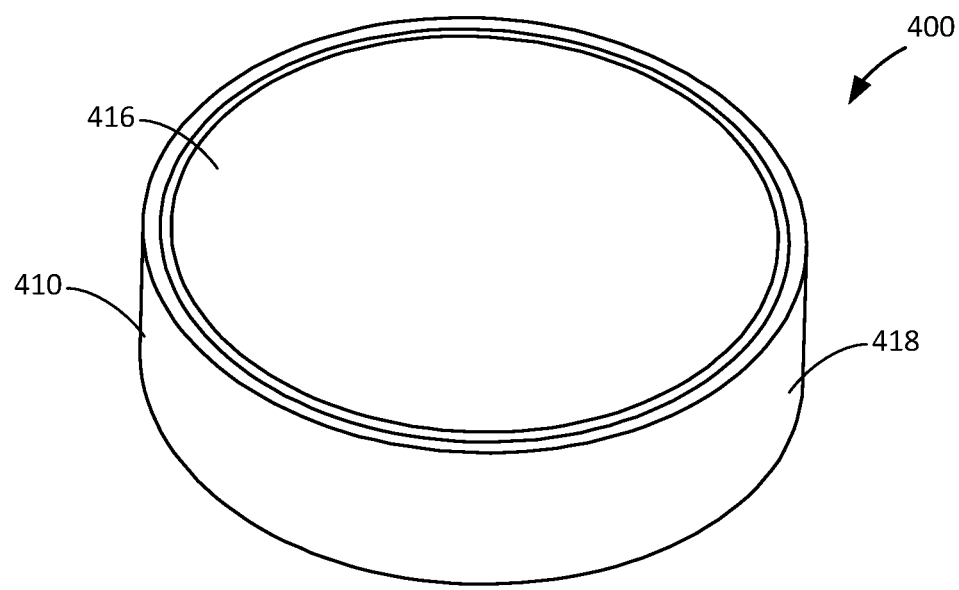
FIG. 4B is a simplified top perspective view of the electronic device shown in FIG. 4A.
Figure 4C:
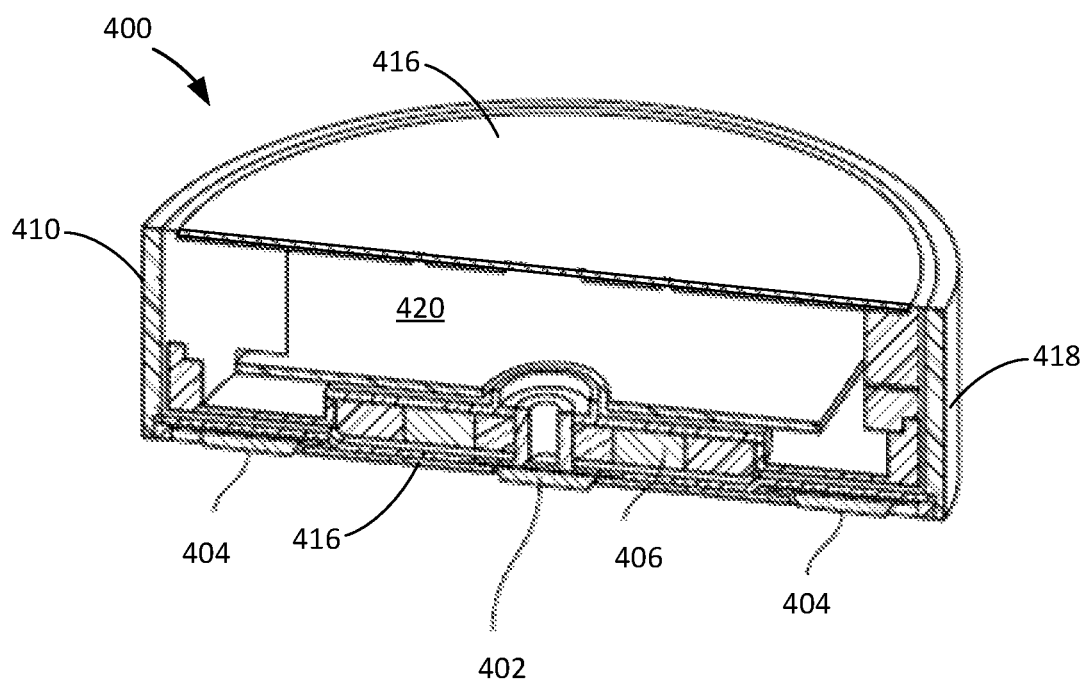
FIG. 4C is a simplified cut-away perspective view of the electronic device shown in FIG. 4A.

Since contacts 120 are disposed at an external surface 116 of device 100 and are generally flush with the external surface 116, some embodiments of the disclosure pertain to an accessory device that includes multiple compliant contacts arranged at an exterior surface of the accessory device in a contact pattern, such as contact pattern 200 shown in FIG. 2, that corresponds with the contact pattern provided on device 100. FIG. 4A is a bottom perspective view of an accessory device 400 that includes such compliant contacts, while FIGS. 4B and 4C are simplified top and cut-away perspective views of accessory electronic device 400.

As shown in FIG. 4A, accessory device 400 includes a central contact 402 surrounded by an annular ring contact 404. Contacts 402 and 404 can be representative of contacts 202 and 204 that are part of contact pattern 200 shown in FIG. 2. Contacts 402, 404 may include a compliant wire mesh or other material that is attached or coupled to respective rings 402a, 404a that can be made from stainless steel or another conductive material and that extend coaxially around the wire mesh portion of each of contacts 402, 404.

Each of contacts 402 and 404 can be sized, shaped and positioned on accessory device 400 to electrically couple to contacts 122 and 124, respectively of electronic device 100. In some embodiments contacts 402, 404 can have surface areas relatively larger than corresponding contacts 122, 124 of electronic device 100. In other embodiments, corresponding contacts 122, 124 of electronic device 100 can have a relatively larger surface area than contacts 402, 404. Increasing the size or surface area of contacts of one of the mating devices relative to the other, helps ensure sufficient contact or a good electrical connection and having smaller and reduced surface area contacts on electronic device 100 can reduce or minimize the amount of surface area, depth, and volume that the contacts require in device 100.

Accessory device 400 can further include a housing 410 having a bottom surface ridge 412 that extends around a perimeter of the device surrounding contacts 402, 404 and defines an outermost portion of housing 410 that can come into physical contact with an accessory device during a mating event as described below with respect to FIGS. 5 and 6. In some embodiments, housing 410 is a rigid housing and can be made of metal, plastic or another suitable material. As shown in FIGS. 4B and 4C, accessory device 400 can further include a top surface 416 and sidewall 418. As such, housing 410 defines an interior cavity 420 in which electronic components of accessory 400 are housed. While accessory device can be any of many different types of devices as mentioned above, in some embodiments, accessory device 400 is a camera that includes a lens (not shown) at surface 416.

Referring back to FIG. 4A, each of contacts 402, 404 can extend in the Z direction beyond a lower surface 414 (e.g., the surface defined by rings 402a, 404a and insulator 408) of housing 410 and slightly beyond ridge 412 such that contacts 402, 404 can be referred to as proud contacts. Contacts 402, 404 are also compliant or flexible such that, when pressed against another surface such as contacts 122, 124 of electronic device 100, they flex toward surface 410.

Accessory device 400 can further include a magnetic element 406 that can facilitate alignment and proper mating of contacts 402, 404 to contacts 122, 124 of electronic device 100. In some embodiments magnetic element 406 can be a ring magnet positioned between contacts 402 and 404 and separated from the contacts by insulator 408. In some embodiments magnetic element 406 can be disposed beneath surface 414 and enclosed within insulator 408. In other embodiments, an external surface of magnetic element 406 can be part of lower surface 414 of accessory device 400.

In a mating operation, magnetic element 406 cooperates with magnetic element 126 of device 100 to impart a sufficient normal force between device 400 and device 100 that compliant contacts 402, 404 are pushed into contacts 122, 124 of device 100 creating a strong and secure electrical connection between the contacts as discussed below with respect to FIGS. 5 and 6.

FIG. 5 is a simplified cross-sectional view of accessory device 400 positioned above and a portion of a host electronic device 500. Host electronic device 500 can be representative of electronic device 100 and include external contacts 522, 524 each of which can be similar to contact 300 described above and include a contact surface 526 and a via 528 formed between the top 516 and bottom 518 surfaces of a wall 510 (e.g., a glass wall) of device 500. In FIG. 5, accessory device 400 is positioned directly opposite an exterior surface 516 of host electronic device 500 in an unmated position. That is, contacts 402, 404 of accessory device 400 are spaced apart from and not in physical or electrical contact with contacts 522, 524 of device 500.

As shown in FIG. 5, electronic accessory can also include one or more electrical insulators 408 enclosing, positioned between, or extending above contacts 402 and/or 404 to insulate the contacts from each other and from other electronic components of electronic accessory 400. Each of contacts 402 and 404 extends slightly below lower surface 414 and a lower surface of ridge 412, which can define a distal most bottom portion of housing 410 as indicated by plane X. Thus, contacts 402, 404 can be the first portion of accessory device 400 that contacts electronic device 500 when the two devices are moved together in a mated position. Contacts 402, 404 can be made of an electrically-conductive compliant or substantially compliant (e.g., resilient, deformable, elastic, or pliable) material. For example, in some embodiments contacts 402, 404 include a conductive woven wire mesh 430 that extends along a bottom exterior portion of the contacts into housing 410 and is coupled to metal ring 402a or 404a (e.g., a stainless steel ring).

Contacts 402, 404 can also include a compliant base portion 432 disposed under mesh 430 in the area at which contacts 402, 404 that enables wire mesh 430 to flex or deform under force (e.g., force applied by the attraction of magnetic element 406 to a corresponding magnetic element (not shown) in electronic device 500) into the direction of housing 410 until bottom surface 414 or ridge 412 comes into physical contact with device 500. Thus, as shown in FIG. 6, when accessory device 400 is moved toward and in contact with electronic device 500, contacts 402, 404 deform in the Z direction (become compressed towards housing 410) until the bottom surface of accessory 400 (e.g., the distal end of ridge 412) contacts external surface 516 of device 500.

The design of contacts 402, 404 enables the contacts to form a strong electrical connection to the contacts 522, 524 of electronic device 500 when accessory 400 is attached to electronic device 500. For example, an outer surface 516 of electronic device 500 and/or the contact area 526 of each of contacts 522, 524 can sometimes be non-uniform (e.g., curved, non-planar, or have raised or recessed portions) due to design, manufacturing tolerances, or debris. The deformable, compliant nature of contacts 402, 404 combined with their proud or protruding relationship with respect to the bottom surface 412, 414 of housing 410 ensures sufficient contact or good electrical connection between contacts 402, 404 and contacts 522, 524 when a sufficient normal force is applied between accessory device 400 and electronic accessory 500.

Wire mesh 430 can be coupled to circuitry on a circuit board 440 also disposed within housing 410. Thus, when contacts 402, 404 are coupled to contacts 522, 524, power and/or data from electronic device 500 can be transferred to accessory 400.

As discussed above, electronic accessory 400 can include one or more alignment elements 406 (e.g., one or more magnets) that cooperate with one or more alignment elements (not shown in FIG. 5) on electronic device 500 and allow accessory 400 to be removably coupled (e.g., engaged or secured) to device 500. Alignment elements 406 can be self-centering for centering (e.g., x- and y-axis position) electronic accessory 400 on electronic device 500 such that corresponding contacts of each device are in proper alignment and contact with each other at a desired attachment location on the outer surface of electronic device 500. In some embodiments, alignment elements 406 can also cooperate with alignment elements of device 500 to ensure that accessory device 400 is mated with device 500 in a specific clocking or rotational orientation. In some embodiments, alignment elements 406 can be positioned adjacent or between the contacts 402, 404 as illustrated in FIG. 5. In other embodiments, the alignment elements can be positioned above either or both contacts 402, 404 or outside of contacts 404. Further, alignment elements 406 can be completely enclosed or partially enclosed by electrical insulators 408.

Figure 7A:
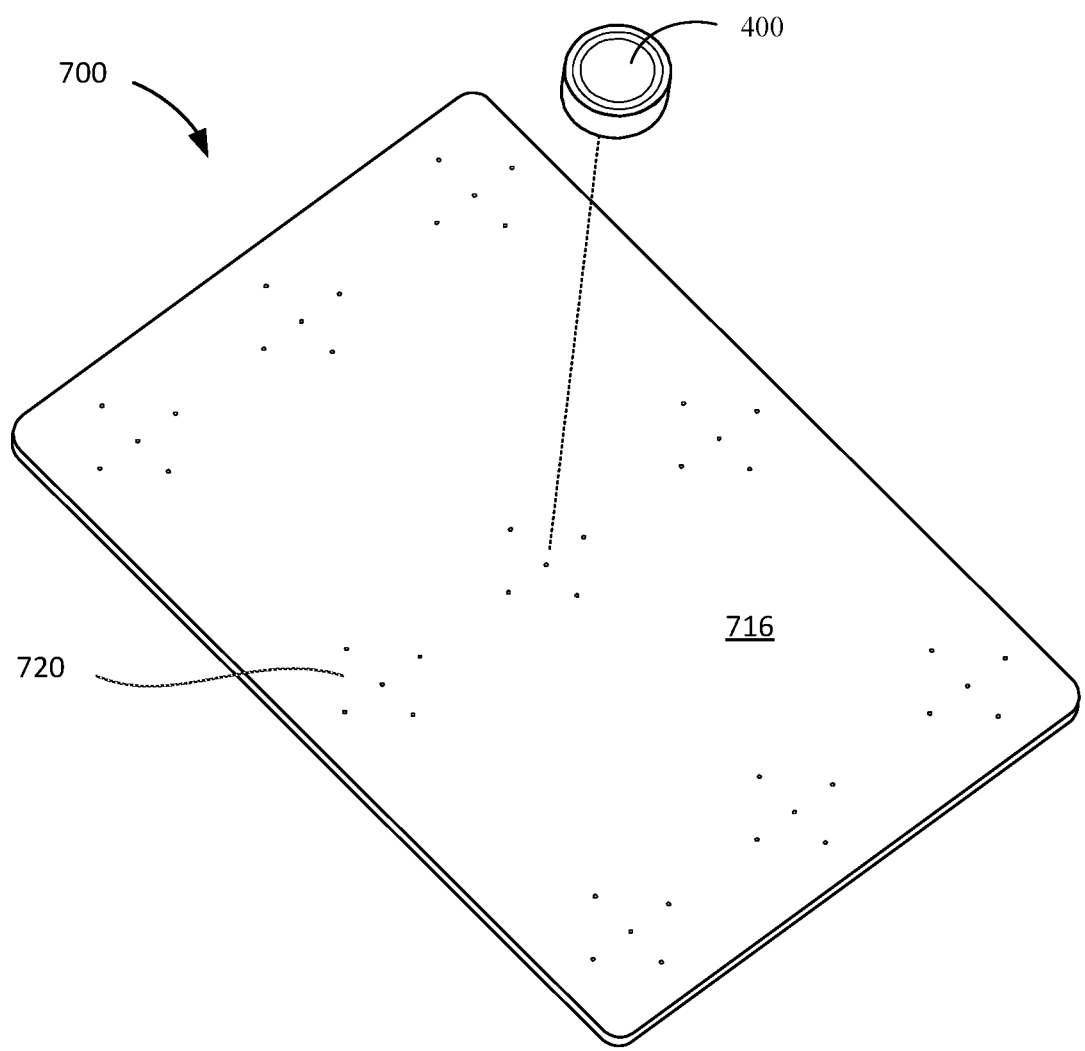
FIG. 7A is a simplified perspective view of a back surface of an electronic device according to some embodiments of the disclosure.

In some embodiments, an electronic device according to the disclosure can include multiple distinct sets or arrangements of contacts 120 (e.g., zones) each of which includes multiple contacts in itself. FIG. 7A is a simplified rear perspective view of an electronic device 700 that includes multiple distinct arrangements of contacts according to some embodiments of the disclosure. Device 700 can be similar to electronic device 100 except that, instead of a single set of external contacts 120, device 700 includes multiple sets of contacts 720 arranged in three separate rows and three separate columns. Thus, as shown in FIG. 7A, electronic device includes nine separate contact arrangements 720. Each set of contacts 720 can provide a different attachment location or attachment zone for an accessory device, such as accessory device 400, and can allow multiple different accessory devices to be simultaneously coupled to device 700 across an outer surface of the device, such as back surface 716. Further, in some embodiments, larger electronic accessory devices (e.g., a keyboard) may attached to multiple (e.g., two or more) ones of contact sets 720. The multiple sets of contacts 720 can be arranged in various patterns with the pattern depicted in FIG. 7 representing one non-limiting example.

Figure 7B:
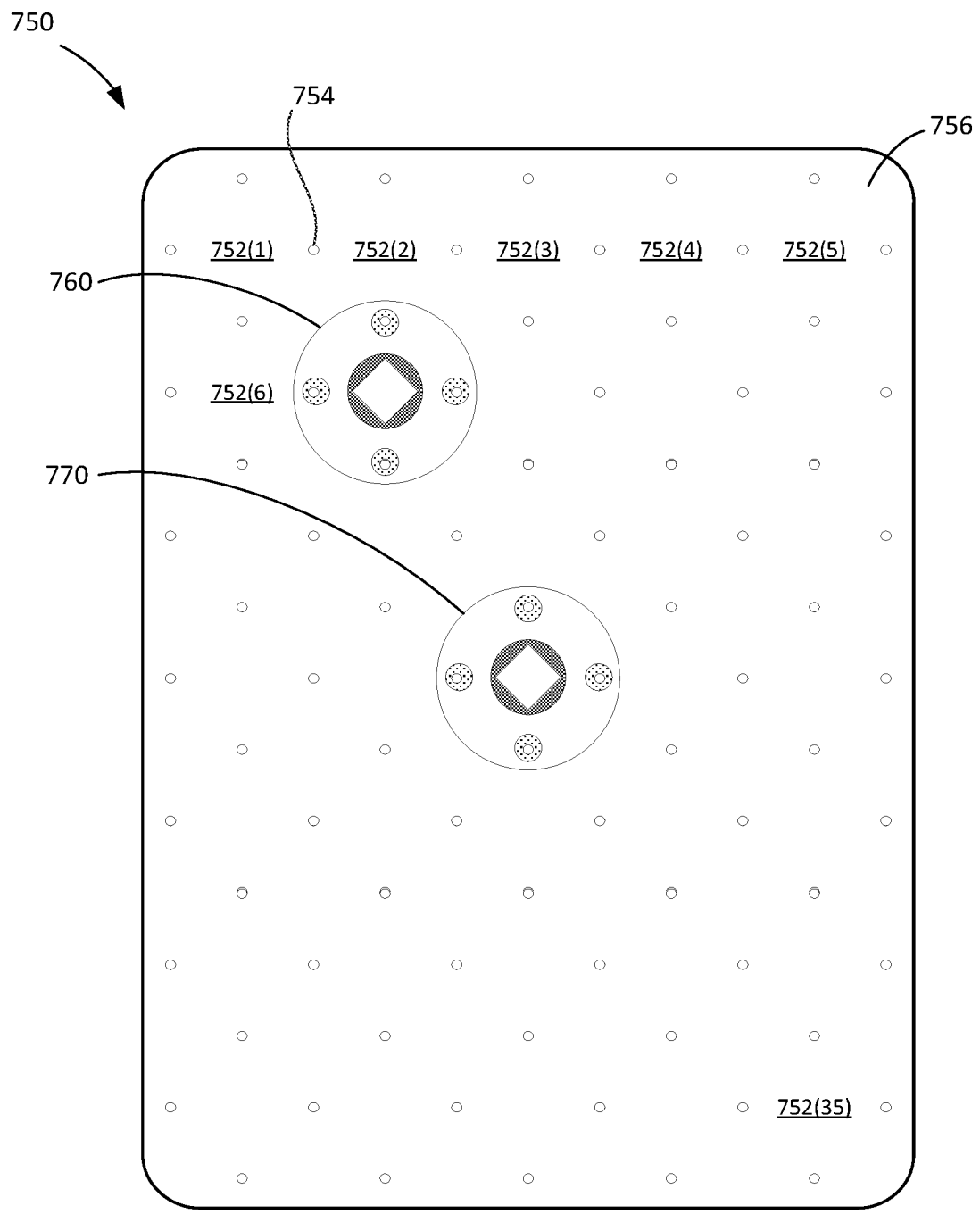
FIG. 7B is a simplified perspective view of a back surface of an electronic device according to some embodiments of the disclosure.
Figure 10A:
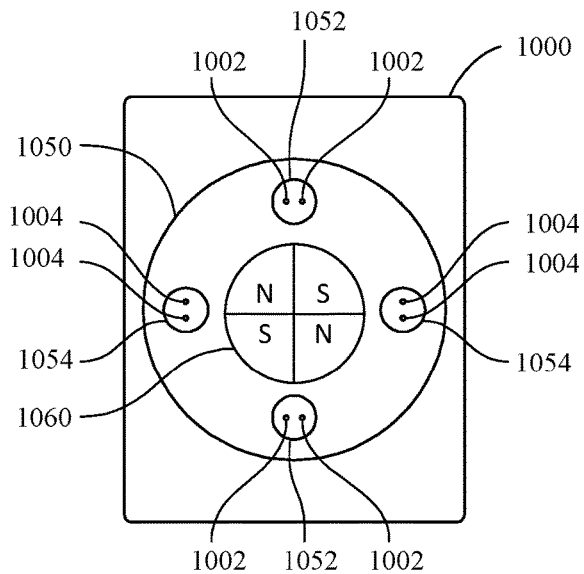
FIGS. 10A-10E illustrate various configurations of contacts of an electronic system according to embodiments of the disclosure.
Figure 10B:
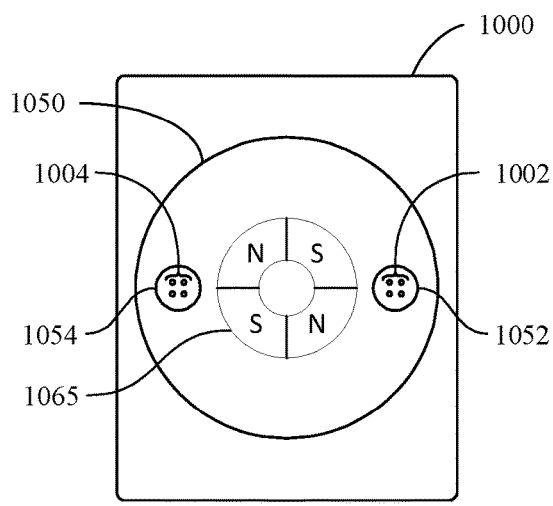
Figure 10C:
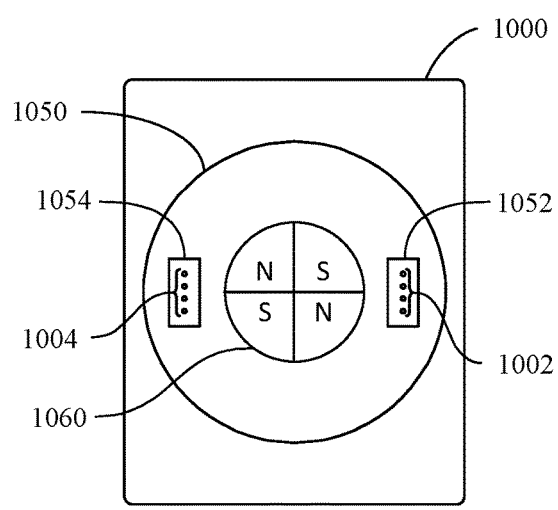
Figure 10D:
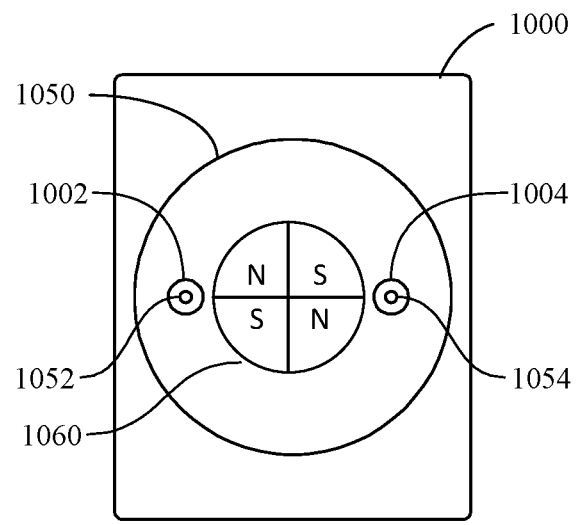
Figure 10E:
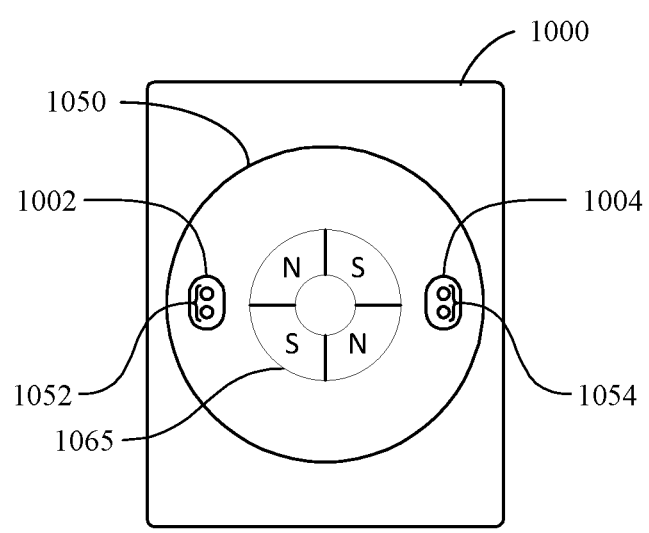

Embodiments of the disclosure are not limited to any specific number of contact arrangements, however, and fewer or more than nine contact arrangements can be included in an electronic device according to other embodiments. For example, FIG. 7B is a simplified rear perspective view of an electronic device 750 that includes multiple distinct contact arrangements 752 according to some embodiments of the disclosure. Specifically, electronic device 750 includes thirty-five separate contact arrangements 752(1) . . . 752(35) arranged in a two-dimensional array of seven rows and five columns across an entirety of a back surface 756 of the device allowing accessory devices to be connected to device 750 at any one of the thirty-five contact arrangements. For illustrative purposes, two accessory devices 760 and 770 (each of which can include a contact pattern 1050 as shown in FIG. 10A below) are shown in FIG. 7B connected to contact arrangements at positions 752(7) and 752(18), respectively. Each contact arrangement 752 can share one or more contacts from an adjacent arrangement and device 750 can include switching circuitry that sets the circuitry within device 750 as appropriate based on which set or sets of contacts one or more accessory devices are coupled to. For example, contact 754 is shared between contact arrangements 752(1) and 752(2). Additionally, while in some embodiments the multiple contact sets 720 can be distributed across a surface of electronic device 700 in a two-dimensional array as shown in both FIGS. 7A and 7B, in other embodiments the multiple contact sets can be distributed in a one-dimensional array or in a pattern that does not include linearly arranged rows and columns.

In some embodiments, each set of contacts 720 can be similar to contact arrangement 120. Thus, for example, each set of contacts 720 can include a single positive polarity contact surrounded by multiple negative polarity contacts (e.g., four negative polarity contacts spaced 90 degrees apart around the positive polarity contact). In other embodiments, a single negative contact may be surrounded by multiple positive polarity contacts. Embodiments of the disclosure are not limited to any particular contact arrangement, however, and other embodiments can include various contact arrangements (as either a single set of contacts 120 or one of multiple sets of contacts 720 on an electronic device) as described below in conjunction with FIGS. 8-11B.

Figure 8:
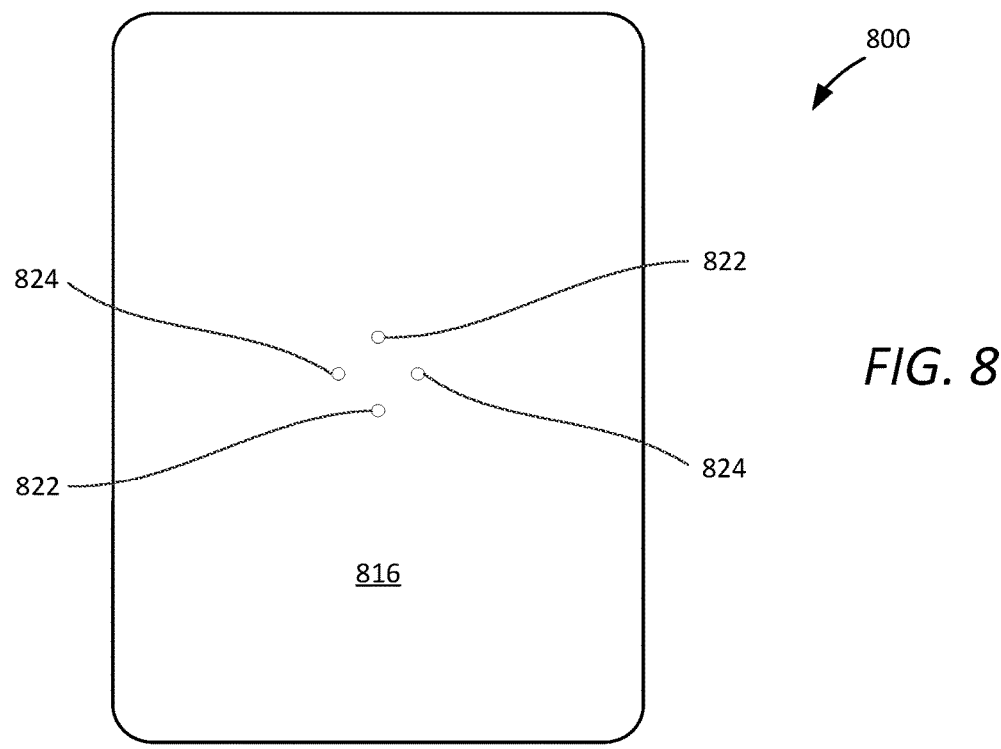
FIG. 8 is a simplified plan view of a back surface of an electronic device according to some embodiments of the disclosure.
Figure 9:
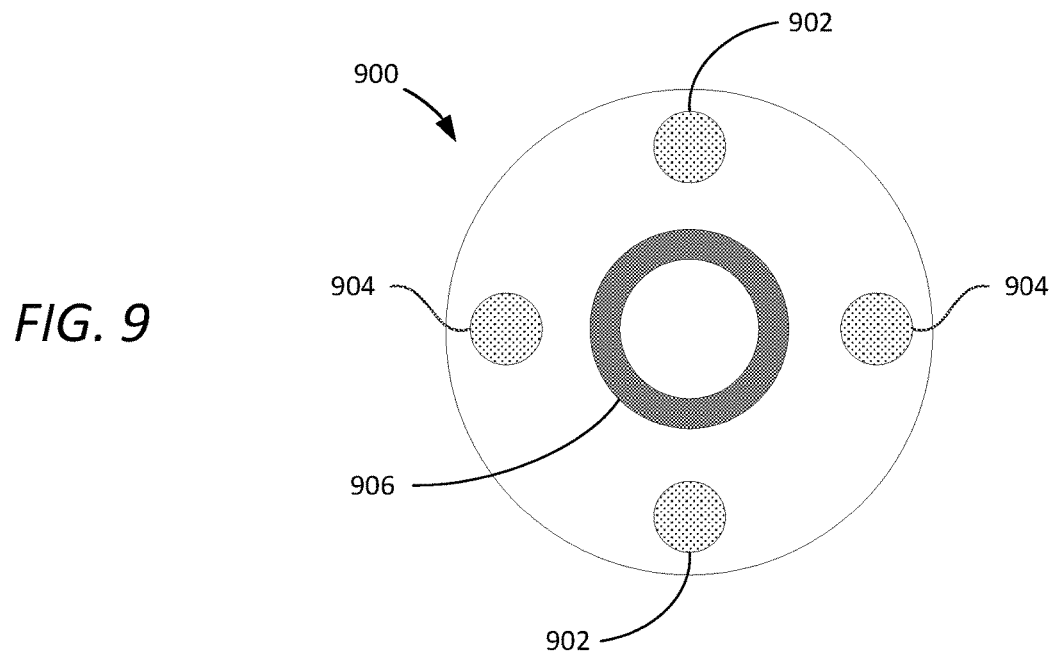
FIG. 9 is a simplified illustration of a contact pattern that can be included on a second electronic device according to some embodiments of the disclosure that can be mated with the electronic device shown in FIG. 8.

FIG. 8 is a simplified plan view of a back surface of a first electronic device 800 according to some embodiments of the disclosure and FIG. 9 is a simplified illustration of a contact pattern 900 that can be included on a second electronic device and mated with (i.e., electrically and mechanically connected to) first device 800. Electronic device 800 can be similar to, and include all the same components as electronic device 100 except that device 800 includes a contact arrangement 820 along a back surface 816 that does not include a center contact. Instead, contact arrangement 820 can include four outer contacts positioned radially along the perimeter of an imaginary circle around a central point at 0, 90, 180 and 270 degrees. In some embodiments, two of the four contacts (e.g., contacts 822) on opposing sides of the circle can have a first polarity central contact 122 while the other two contacts (e.g., contacts 824) can have an opposite polarity. For example, contacts 822 can have a positive polarity while contacts 824 can have a negative polarity. Each of contacts 822, 824 can be an external contact, such as contacts 300, described above with respect to FIG. 3. Additionally, while electronic device 800 includes four contacts in contact arrangement 820, embodiments of the disclosure are not limited to any particular number of contacts and some embodiments include fewer or more than four contacts in a similar annular arrangement with the contacts evenly spaced along a perimeter of the imaginary circle.

Referring now to FIG. 9, contact pattern 900 (shown enlarged as compared to contact arrangement 820) can be included on a second electronic device that can be mated with first device 800. Contact pattern 900 includes four contacts including two opposing contacts 902 having a first polarity and two opposing contacts 904 having a second polarity opposite the first polarity.

Contact pattern 900 corresponds to contact arrangement 800 such that each individual contact in pattern 900 is sized and positioned to electrically couple to a contact in contact arrangement 800 when device 800 is mated with a device having contacts arranged according to contact pattern 900. Additionally, contacts 902, 904 can be compliant, deformable mesh contacts similar to contact 402 described above with respect to FIG. 4.

In some embodiments the polarity of contacts 902, 904 is predetermined such that contact pattern 900 can be coupled to electronic device 800 in one of two orientations that are rotated 180 degrees from each other. In other embodiments the polarity of contacts 902, 904 can be switched (i.e, set to either positive or negative polarity by circuitry within the electronic device that contact pattern 900 is part of) based on the polarity of contacts of the electronic device (e.g., device 800) contacts 902, 904 are coupled to thus enabling contact pattern 900 to be coupled to electronic device 800 in any one of four separate orientations.

To facilitate alignment and proper mating of contact pattern 900 to contacts 820, electronic device 800 can include one or more magnetic elements (not shown in FIG. 8) and contact pattern 900 can include one or more magnetic elements 906. The two sets of magnetic elements can cooperate together similar to those described with respect to FIGS. 1, 2A and other figures to secure the accessory device and electronic device together in a mated position with sufficient normal force between the two devices as to create a strong electrical connection between the corresponding contact pairs.

Additional configurations and embodiments of contact arrangements according to the disclosure are presented in FIGS. 10A-10E. Shown in each of these figures is an electronic device 1000 and a contact pattern 1050 for an electronic accessory (not shown) that differ in each figure based on contact arrangements depicted in the figures. In each such embodiment shown, electronic device 1000 can include one or more features, in whole or in part, as described above with respect to electronic devices 100 and 500 and an electronic accessory having contact pattern 1050 can include one or more features, in whole or in part, as described above with respect to accessory device 400. For example, the electronic accessory device can include a magnet 1060 or 1065 or other coupling mechanism for engaging and securing the contacts in contact pattern 1050 to corresponding contacts of electronic device 1000. In some embodiments, magnet 1060 or 1065 can be positioned and aligned to perform a rotational clocking function that cooperates with a magnet (not shown) in the electronic accessory to ensure that the electronic accessory is coupled to electronic device 1000 in a specific orientation.

Similar to electronic accessory 400, an electronic accessory having contact pattern 1050 can have one or more compliant or substantially compliant positive polarity contacts 1052 and negative polarity contacts 1054 also spaced apart 90 or 180 degrees along a periphery of an imaginary circle. In the illustrated embodiments, contacts within contact pattern 1050 are spaced apart 90 degrees (FIG. 10A) or 180 degrees (FIGS. 10B-10E) and can alternate between positive and negative polarity.

Electronic device 1000 can include one or more positive polarity contacts 1002 and one or more negative polarity contacts 1004 in each contact arrangement disposed at an external surface of device 1000. Contacts 1002 and 1004 are sized and positioned to electrically couple to contacts 1052, 1054 when an accessory device having contact pattern 1050 is mated with electronic device 1000. Further, the electronic device 1000 can include multiple or redundant same polarity contacts 1002a, 1002b at each location (e.g., two, three, four, five, six or more redundant contacts). While illustrated as discrete or multiple spaced apart dot or point contacts 1002, the contacts 1002 of electronic device 1000 can also extend across portions of or substantially the entire outer surface of the electronic device 610 in a continuous or substantially continuous manner (e.g., in space apart parallel lines). Further, in other embodiments, contacts of the electronic device or electronic accessory may be spaced apart by other oblique or non-oblique angles.

Figure 11A:
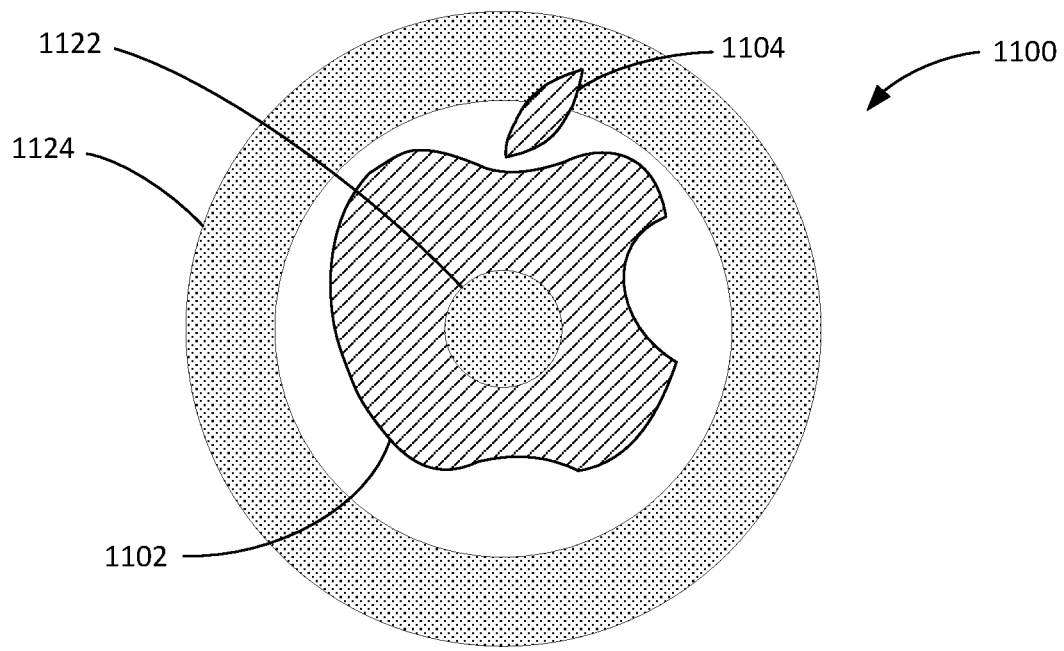
FIGS. 11A and 11B illustrate additional configurations of contacts of an electronic system according to embodiments of the disclosure.
Figure 11B:
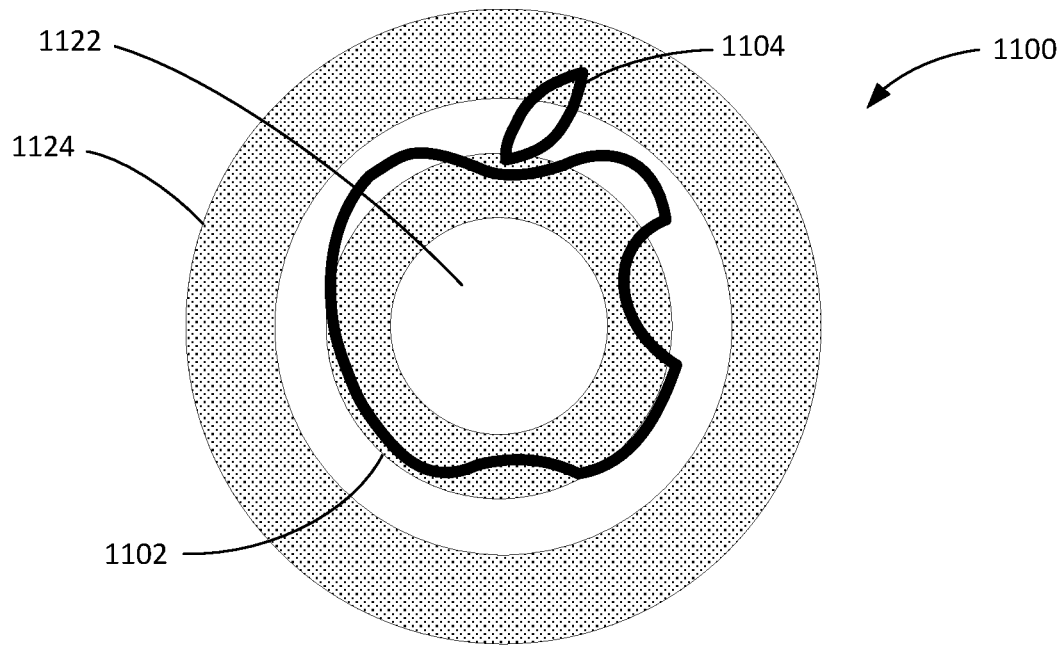

FIGS. 11A and 11B depict yet additional contact configurations or embodiments according to the disclosure. In contrast to the symmetrical contact arrangements discussed above with respect to electronic devices 100, 800 and 1000, in some embodiments contact arrangements for one or more sets of external contacts formed at an exterior surface of an electronic can have a patterned, non-geometric shape. For example, in some embodiments, one the externals contacts, similar to contact 300, can be arranged in a pattern such as a company logo or one or more letters or numbers. One particular example is illustrated in FIG. 11A where an arrangement of external contacts be included on an electronic device 100 instead of contact arrangement 120 discussed above. The arrangement of external contacts includes a central contact 1102 having a first polarity (e.g., a positive polarity) and an outer contact 1104 having a second, opposite polarity (e.g., a negative polarity) arranged in a pattern according to the Apple logo. Central contact 1102 represents the body of the apple and outer contact 1104 represents the stem or leaf of the apple. Also shown in FIG. 11A is a bullseye contact pattern that can be similar to contact pattern 200 discussed above and included on an accessory device. The bullseye contact pattern includes an inner deformable, compliant contact 1122 (e.g., a wire mesh contact) that aligns with central contact 1102 and an outer deformable, compliant contact 1124 (e.g., another wire mesh contact) that aligns to couple with outer contact 1104. The contact system 1100 can also include other components, such as alignment elements, as discussed in the various contact arrangements discussed above.

In another embodiment depicted in FIG. 11B, a contact system 1150 includes a first contact arrangement that can be disposed at an exterior surface of an electronic device, such as device 100, and that includes a central contact 1152 having a first polarity (e.g., a positive polarity) and an outer contact 1154 having a second, opposite polarity (e.g., a negative polarity) arranged in a pattern. Contacts 1152 and 1154 are arranged according to the Apple logo similar to contacts 1102 and 1104 discussed in FIG. 11A but differ in that the contact surface of each contact (e.g., the portion corresponding to contact surface 302) is patterned according to an outline of the Apple logo instead of a completely filled in logo. As shown, central contact 1152 represents the body of the apple and outer contact 1154 represents the stem or leaf of the apple. Also shown in FIG. 11B is a modified bullseye contact pattern including an inner deformable, compliant ring contact 1162 and an outer deformable, compliant ring contact 1164, which can be part of an accessory device, such as device 400.

While FIGS. 11A and 11B are representative of particular patterns that one or more contact systems according to embodiments of the disclosure can take the shape of, embodiments are not limited to any particular pattern and can be arranged in a variety of different logos, patterns (geometric and non-geometric), etc. Additionally, while certain specific devices were described as electronic device 100 herein, device 100 can include any device that receives or transmits audio, video or other types of data signals or that delivers power to another device. For example, electronic device 100 can include any portable music player (e.g., MP3 device and Apple's iPod device), portable video player (e.g., portable DVD players), cellular telephone (e.g., smart telephones such as Apple's iPhone devices), video camera, digital still camera, projection system (e.g., holographic projection systems), gaming system, PDA, as well as tablet (e.g., Apple's iPad devices), desktop, laptop or other mobile computer, storage device, portable media player, navigation system, or monitor.

Similarly, electronic accessory 400 can be an variety of different electronic devices, accessories, or peripherals configured to operate in conjunction with to share data, power, or both with the electronic device 100 via corresponding electrical contacts when the electronic accessory is in direct, physical contact with the electronic device. As examples, electronic accessory 400 can be a camera, camera accessory, lens, speaker, keyboard, mouse, light, battery, stylus, monitor, drone, storage device, or headset. The electronic accessories may include various components including circuit boards, processors, power sources, storage devices, buttons, displays, wireless communication devices requiring the power or data transfer from the electronic device via the corresponding contacts. Certain electronic accessories include specialized or particular components. For example, a camera may include a lens, imager, processor, and memory that may be coupled to the electronic device to share data, power, or both via the contacts. Further, as described above, more than one of these electronic accessories may be coupled to the electronic device if there are multiple or a plurality of sets of contacts for attachment. For simplicity, various internal components, such as the control circuitry, graphics circuitry, bus circuitry, memory devices, storage devices, power sources, sensors, and other components of electronic device 100 or electronic accessory 400 are not shown in the figures or discussed herein.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

References throughout the foregoing description to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the present invention may be combined in any suitable manner in one or more embodiments. One skilled in the relevant art will recognize that the present invention can be practiced without one or more of the specific features or advantages of a particular embodiment. In other instances, additional features and advantages may be recognized in certain embodiments that may not be present in all embodiments of the present invention. Additionally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. Additionally, spatially relative terms, such as "bottom or "top" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

What is claimed is:

1. An electronic device comprising:
a housing;
electronic circuitry disposed within the housing;

one or more magnets configured to align and removably couple the electronic accessory to the electronic device; and a contact area disposed at an external surface of the housing, the contact area including two or more spaced apart contacts, wherein each of the contacts is electrically coupled to the electronic circuitry and comprises:
   a conductive contact surface positioned at the external surface of the housing, the contact surface configured to directly contact a corresponding contact of the electronic accessory when the electronic device is coupled to the electronic accessory; and
   an electrically-conductive via extending from the contact surface through the outer surface of housing.

2. The electronic device of claim 1 comprising a plurality of identical contacts areas distributed across the external surface of the housing, each of the contact areas including a plurality of spaced apart contacts arranged in a pattern with each contact in the plurality of contacts being electrically coupled to the electronic circuitry and including a conductive contact surface positioned at the external surface of the housing and an electrically-conductive via extending from the contact surface through the outer surface of housing.

3. The electronic device of claim 1 wherein the two or more contacts comprise at least one negative contact and at least one positive contact.

4. The electronic device of claim 1 further comprising two or more contact areas spaced apart from each other, each having two or more spaced apart contacts disposed on the external surface of the housing such that the electronic accessory may be coupled to the electronic device at the two or more contact areas spaced apart from each other.

5. The electronic device of claim 1 wherein data and power are configured to be alternately transferred via the two or more spaced apart contacts.

6. The electronic device of claim 1 wherein conductive contact surfaces of the two or more spaced apart contacts are deposited over the external surface of the housing such that they are essentially flush with the external surface.

7. The electronic device of claim 6 wherein the one or more intermediary layers comprise an adhesive for coupling the contact surface of the contacts to the outer surface of the housing.

8. The electronic device of claim 1 further comprising a circuit board within the housing and wherein the contacts are electrically coupled to processing circuitry disposed on the circuit board.

9. The electronic device of claim 1 wherein a first contact of the two or more contacts extends concentrically in a ring configuration around a second contact of the two or more contacts, the second contact being a point contact disposed in a center of the first contact.

10. The electronic device of claim 1 wherein the first contact comprises multiple contacts extending concentrically in the ring configuration.

11. An electronic accessory device comprising:
a housing including an upper surface, a lower surface, and one or more side surfaces extending along an outer periphery of the housing between the upper and lower surfaces, the lower surface including a rigid footing portion having a bottom surface aligned in a first plane;
at least one electronic component positioned within the housing;
first and second electrical contacts electrically coupled to the at least one electronic component and spaced apart along the lower surface, each of the first and second contacts including a conformable contact surface that extends away from the housing beyond the first plane; and
one or more magnets positioned along the bottom surface.

12. The electronic accessory of claim 11 wherein the contacts are electrically coupled to processing circuitry disposed on a circuit board within the housing.

13. The electronic accessory of claim 11 wherein the conformable contact surface comprises a compliant conductive material comprises wire mesh.

14. The electronic accessory of claim 11 wherein the first and second electrical contacts comprise at least one negative contact and at least one positive contact.

15. The electronic accessory of claim 11 wherein polarities of the two or more spaced apart contacts are selectively switchable.

16. The electronic accessory of claim 11 wherein the one or more magnets are configured to align and couple the electronic accessory to a second electronic device.

17. The electronic accessory of claim 11 wherein a first contact of the two or more contacts extends concentrically around a second contact of the two or more contacts in a ring configuration, the second contact being a point contact disposed at a center of the ring configuration.

18. The electronic accessory of claim 11 wherein multiple contacts of the two or more contacts extend concentrically around a second contact of the two or more contacts in a ring configuration, the second contact being a point contact disposed at a center of the ring configuration.

19. The electronic accessory of claim 11 wherein the conformable contact surface of the first and second concentric contacts are bonded to conductive rings.

20. A system comprising:
a first electronic device and a second electronic device, the first electronic device comprising:
   a first device housing;
   a contact area disposed at an external surface of the first device housing, the contact area including two or more spaced apart contacts, each of the contacts comprising: a conductive contact surface positioned at the external surface of the device housing, the contact surface configured to directly contact a corresponding contact of the electronic accessory when the electronic device is coupled to the electronic accessory; and an electrically-conductive via extending from the contact surface through the outer surface of device housing; and
   a first magnetic component disposed adjacent to or within the contat area; and
the second electronic device comprising:
   a second device housing including an upper surface, a lower surface, and one or more side surfaces extending along an outer periphery of the second device housing between the upper and lower surfaces, the lower surface including a rigid footing portion having a bottom surface aligned in a first plane;
   at least one electronic component positioned within the second device housing;
   first and second electrical contacts electrically coupled to the at least one electronic component and spaced apart along the lower surface, each of the first and second contacts including a conformable contact surface that extends away from the second device housing beyond the first plane; and
   a second magnetic component positioned along the bottom surface in an arrangement aligned with the first magnetic component of the first electronic device, wherein during a mating event, the first and second magnetic components cooperate to facilitate alignment of the second electronic device to the first electronic device and impart a sufficient normal force such that the compliant first and second electrical contacts of the second device deform and are pushed into the contacts of the first device creating a strong and secure electrical connection to the two or more spaced apart contacts in the contact area of the first electronic device.

* * * * *

UNITED STATES PATENT AND TRADEMARK OFFICE
CERTIFICATE OF CORRECTION

PATENT NO. : 10,579,096 B1
APPLICATION NO. : 16/416783
DATED : March 3, 2020
INVENTOR(S) : Senem E. Emgin and Florence W. Ow Page 1 of 1

It is certified that error appears in the above-identified patent and that said Letters Patent is hereby corrected as shown below:

In the Specification

In Column 8, Line 21, please replace "surface 410." with --surface 416.--

In the Claims

In Column 15, In Claim 1, Line 14, delete "the outer surface" and insert --the external surface--

In Column 15, In Claim 2, Line 24, delete "the outer surface" and insert --the external surface--

In Column 15, In Claim 7, Line 43, delete "the outer surface" and insert --the external surface--

In Column 15, In Claim 10, Line 56, delete "the" ring configuration and insert --a-- ring configuration In Column 16, In Claim 15, Line 15, delete "the two or more spaced" and insert --two or more spaced--

In Column 16, In Claim 17, Line 21, delete "the two or more spaced" and insert --two or more spaced--

In Column 16, In Claim 18, Line 26, delete "the two or more spaced" and insert --two or more spaced--

In Column 16, In Claim 20, Line 46, delete "the outer sur-" and Line 47, delete "face" and replace with --the external surface--

Signed and Sealed this
Sixteenth Day of June, 2020

Andrei Iancu
*Director of the United States Patent and Trademark Office*